United States Patent
Schürz et al.

(10) Patent No.: US 7,421,332 B2
(45) Date of Patent: Sep. 2, 2008

(54) CONTROL METHOD AND CONTROL DEVICE FOR AN ACTUATOR

(75) Inventors: Willibald Schürz, Pielenhofen (DE); Joachim Wagner, Dietfurt a. d. Altmühl (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/597,050

(22) PCT Filed: Jan. 11, 2005

(86) PCT No.: PCT/EP2005/050096

§ 371 (c)(1), (2), (4) Date: May 3, 2007

(87) PCT Pub. No.: WO2005/066478

PCT Pub. Date: Jul. 21, 2005

(65) Prior Publication Data

US 2008/0035117 A1 Feb. 14, 2008

(30) Foreign Application Priority Data

Jan. 12, 2004 (DE) .................. 10 2004 001 676

(51) Int. Cl.
*F02D 41/20* (2006.01)

(52) U.S. Cl. ...................... 701/105; 123/445

(58) Field of Classification Search ......... 701/103–105, 701/115, 102; 123/478, 480, 445
See application file for complete search history.

(56) References Cited

U.S. PATENT DOCUMENTS 7,201,127 B2 * 4/2007 Rockwell et al. ............ 701/113
7,318,419 B2 * 1/2008 Dietl et al. .................. 123/478

OTHER PUBLICATIONS

International Search Report and Written Opinion in German & English Translation; PCT/EP2005/050096; 18 Pgs., Apr. 12, 2005.

* cited by examiner

*Primary Examiner*—Hieu T Vo
(74) *Attorney, Agent, or Firm*—Baker Botts L.L.P.

(57) ABSTRACT

A control method for an actuator (1-4) of an injector of a fuel injection system in an internal combustion engine has the following steps: specification of a target value (SOISOLL) for the start of the injection; electric control of the actuator (1-4) at a specific trigger time (tTRIGGER) with a specific actuator energy (E); detection of an actual value (SOI1IST, SOI2 IST, SOI3 IST, SOI4 IST ) at the start of the injection; determination of the deviation between the target and actual values (DeltaSOI1, DeltaSOI2 , DeltaSOI3 , DeltaSOI4) at the start of the injection; and adjustment of the actuator energy (E) in accordance with the deviation between the target and actual values (DeltaSOI1 , DeltaSOI2 , DeltaSOI3 , DeltaSOI4) at the start of the injection to control the start of the injection.

20 Claims, 2 Drawing Sheets

CONTROL METHOD AND CONTROL DEVICE FOR AN ACTUATOR

CROSS-REFERENCE TO RELATED APPLICATIONS

This application is a U.S. national stage application of International Application No. PCT/EP2005/050096 filed Jan. 11, 2005, which designates the United States of America, and claims priority to German application number DE 10 2004 001 676.3 filed Jan. 12, 2004, the contents of which are hereby incorporated by reference in their entirety.

TECHNICAL FIELD

The invention relates to a control method for an actuator of an injector of a fuel injection system for an internal combustion engine and to a corresponding control device.

BACKGROUND

The injectors in modern fuel injection systems for internal combustion engines are increasingly controlled by piezoactuators, whose actuating characteristics are more dynamic than those of conventional electromagnetic actuators. The individual piezoactuators are therein controlled according to a pre-specified Start Of Injection (SOI) at a specific trigger time with a specific actuator energy in order to set the desired start of injection. It must be noted in this regard that the transmission of power from the piezoactuator to the injector's valve needle is prone to a delay so that the trigger time of the electric control signal for the piezoactuator and the ensuing start of injection are separated by a delay that is specific to the design type used.

What is problematic therein is that said delay between the trigger time of the electric control signal for the actuator and the ensuing start of injection is subject to fluctuations due to mechanical and electric tolerances, and that can result in errors in setting the start of injection.

SUMMARY

The object of the invention is therefore to provide a control method and a corresponding control device for adjusting mechanical and electric tolerances in the delay between the trigger time of the electric control signal for the actuator and the ensuing start of injection.

This object can be achieved by a control method for an actuator of an injector of a fuel injection system for an internal combustion engine, comprising the following steps: specifying a target value for the start of injection, electrically controlling the actuator at a specific trigger time with a specific actuator energy, detecting an actual value at the start of injection, determining a deviation between the target and actual values at the start of injection, and setting the actuator energy as a function of the deviation between the target and actual values at the start of injection for controlling the start of said injection.

Controlling may take place jointly for a plurality of actuators by setting the actuator energy jointly for a plurality of actuators. The method may further comprise the following steps: detecting the actual value at the start of injection separately for the individual actuators, determining the deviation between the target and actual values at the start of injection separately for the individual actuators, determining the mean deviation between the target and actual values at the start of injection for a plurality of actuators, and setting the actuator energy jointly for a plurality of actuators according to the mean deviation between the target and actual values at the start of injection. Controlling may take place individually for in each case one of a plurality of actuators, with the actuator energy being set in each case on an actuator-specific basis. The control method may further comprise the following steps: detecting the actual value at the start of injection separately for the individual actuators, determining the deviation between the target and actual values at the start of injection separately for the individual actuators, and setting the actuator energy separately for the individual actuators as a function of the respective actuator-specific deviation between the target and actual values at the start of injection. The trigger time for controlling the actuators can be set independently of the deviation between the target and actual values at the start of injection. As part of controlling and in addition to setting the actuator energy, the trigger time can also be set as a function of the deviation between the target and actual values at the start of injection for controlling said start of injection. The actuator energy can be set jointly for a plurality of actuators while the trigger time is set separately for the individual actuators. The actual value at the start of injection can be detected by means of a seat contact switch, with said seat contact switch detecting a valve needle position of the injector. The actuator energy can be set within the scope of controlling on a discrete time and/or on a discrete value basis.

The object can also be achieved by a control device for an actuator of an injector for a fuel injection system of an internal combustion engine, comprising a controlling element for electrically controlling the actuator at a specific trigger time with a specific actuator energy a measuring device for detecting an actual value at the start of injection, and a first controller for setting the actuator energy as a function of a deviation between the measured actual value at the start of injection and a pre-specified target value at the start of injection.

The actuator energy can be set jointly within the scope of controlling for a plurality of actuators. The control device may further comprise a computing unit for calculating a mean value of the deviation between the target and actual values at the start of injection for a plurality of actuators, with the first controller setting the actuator energy for a plurality of actuators in keeping with the mean value. The actuator energy can be set individually within the scope of controlling for a plurality of actuators. The control device may also comprise a second controller for setting the trigger time for controlling the actuator as a function of the deviation between the measured actual value at the start of injection and the pre-specified target value at the start of injection. The measuring device may have a seat contact switch which detects a valve needle position of the injector.

The invention embraces the general technology of setting the actuator energy expended in controlling the actuator in order to adjust the start of injection to a pre-specified target value. If, for example, the actual start of injection is behind the pre-specified target value for the start of injection, then the actuator energy will preferably be increased as part of inventive controlling in order to bring the actual start of injection forward in time. If, by contrast, the actual start of injection is ahead of the target value for the start of injection, then the actuator energy will preferably be decreased as part of inventive controlling in order to put the start of injection back in time.

Said controlling preferably takes place jointly for a plurality of actuators by setting the actuator energy jointly for a plurality of actuators. For example, the actuator energy can as part of inventive controlling be set jointly for all actuators of an internal combustion engine in order to achieve the desired start of injection. It is, however, alternatively possible for the internal combustion engine to have a plurality of cylinder banks, with the actuator energy for the actuators of one cylinder bank being in each case set jointly.

Joint setting of the actuator energy for a plurality of actuators offers the advantage of allowing an economical output stage to be used (LC instead of CC).

When the actuator energy is set jointly for a plurality of actuators, any actuator-specific deviations cannot, in the nature of things, be taken into account within the scope of energy controlling. The aim of controlling when the actuator energy is set jointly for a plurality of actuators is therefore preferably to minimize the mean deviation between the target and actual values at the start of injection via the individual actuators. Within the scope of the inventive control method the mean deviation between the target and actual values at the start of injection is therefore preferably determined for the jointly controlled injectors, with the actuator energy being set as a function of said determined deviation between the target and actual value.

It is, however, also possible within the scope of the invention for controlling to take place individually for in each case one of a plurality of actuators, with the actuator energy being set in each case on an actuator-specific basis. Said manner of individual setting of the actuator energy offers the advantage of also allowing actuator-specific deviations to be taken into account.

Actuator-specific deviations can be taken into account in the above-described joint setting of the actuator energy for a plurality of actuators by, in addition to energy controlling, also setting the trigger time of the electric control signal for the actuators for each individual actuator. The inventive control device therefore preferably has two closed loops, with one of said loops setting the actuator energy collectively for a plurality of actuators and the other setting the trigger time of the electric control signal for each individual actuator. Both closed loops therein preferably proceed from the deviation between the target and actual values at the start of injection.

The actual value at the start of injection can within the scope of the invention be determined by means of, for example, a seat contact switch that detects the injector's valve needle position. Seat contact switches of said type are known to persons skilled in the art and so will not be explained further in the description that follows.

It must further be mentioned that the actuator energy can within the scope of inventive controlling be set on a discrete time and/or on a discrete value basis. When set on a discrete time basis the actuator energy is preferably changed discontinuously between successive injection operations, with its being possible to reset it in each case after one or more injection operations. When set on a discrete value basis the actuator energy is set, by contrast, in a discontinuous graduated manner, which is in any event customary in the case of, for example, digital controllers.

Other advantageous developments of the invention are explained in more detail below with the aid of the Figures along with the description of the preferred exemplary embodiments of the invention.

DETAILED DESCRIPTION

Figure 1:
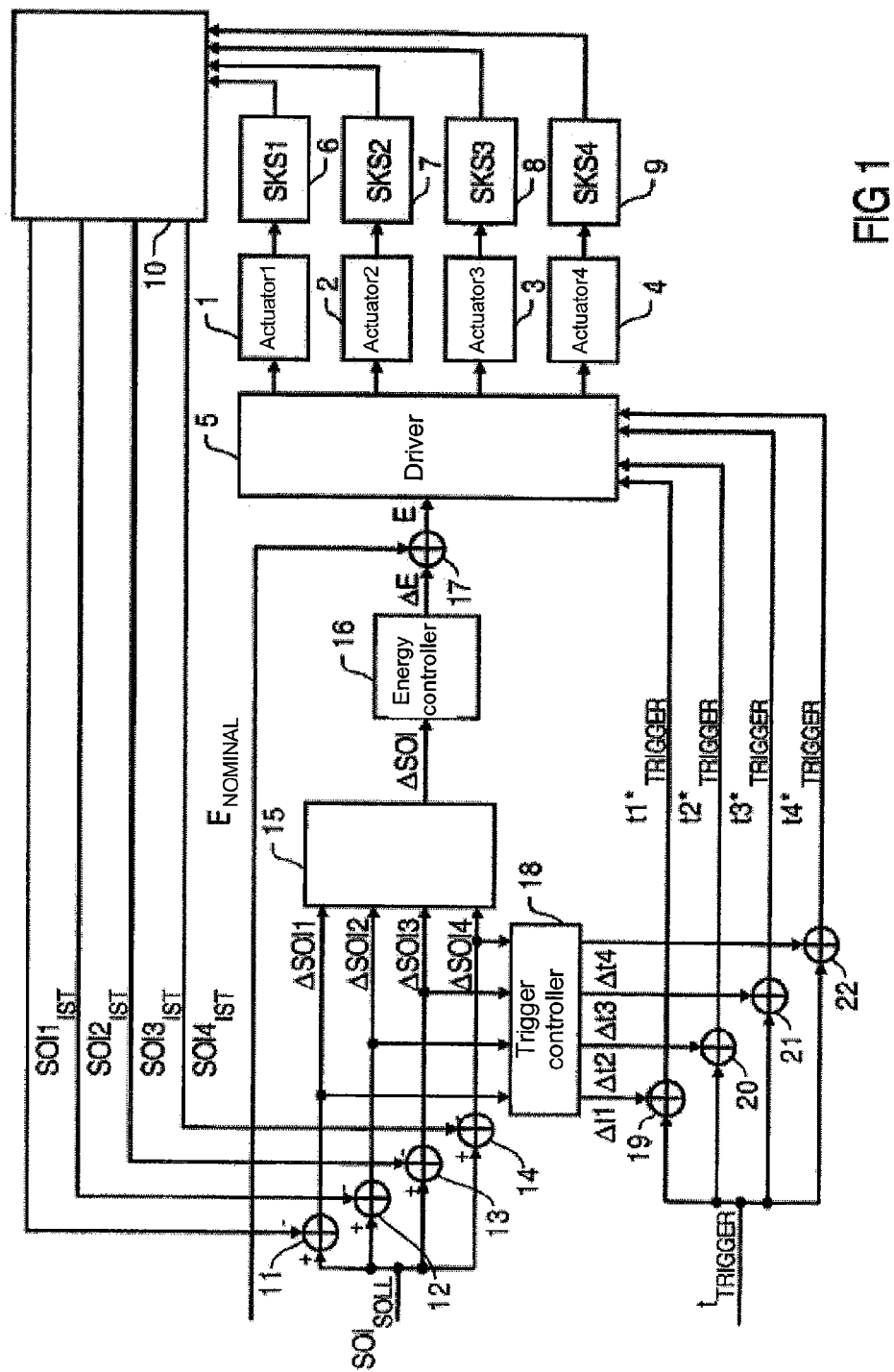
FIG. 1 is an equivalent control circuit diagram of an inventive control device for a plurality of piezoactuators of a fuel injection system for an internal combustion engine.

The equivalent control circuit diagram shown in FIG. 1 illustrates the inventive control method for four piezoactuators 1-4 each of which controls the motion of the respective valve needle in one injector of a fuel injection system.

The piezoactuators 1-4 are therein electrically controlled by a driver circuit 5 that can be embodied conventionally and so is not described further here. The individual piezoactuators 1-4 are therein each assigned a seat contact switch 6-9, with the individual seat contact switches 6-9 detecting the position of the valve needle of the injectors controlled by the piezoactuators 1-4.

The seat contact switches 6-9 are connected at the output side to an evaluation unit 10 which determines the actual start of injection $SOI1_{IST}$, $SOI2_{IST}$, $SOI3_{IST}$, $SOI4_{IST}$ of the individual injectors from the output signals of the seat contact switches 6-9.

At the input side the inventive control device receives a target value $SOI_{SOLL}$ for the start of injection, with its being possible for said target value $SOI_{SOLL}$ to be determined by means of, for instance, a multidimensional family of characteristics which, for the sake of simplification, is not shown here and can be implemented in, for example, the Electronic Control Unit (ECU). As input variables for determining the target value $SOI_{SOLL}$ the multidimensional family of characteristics can take account of, for example, operational variables such as the internal combustion engine's speed or mechanical load.

The pre-specified target value $SOI_{SOLL}$ is taken along with the actual values $SOI1_{IST}$, $SOI2_{IST}$, $SOI3_{IST}$, or, as the case may be, $SOI4_{IST}$ in each case to a subtractor 11, 12, 13, 14, with said subtractors 11-14 each calculating a deviation $\Delta SOI1$, $\Delta SOI2$, $\Delta SOI3$ or, as the case may be, $\Delta SOI4$ between the target and actual values. Said deviations $\Delta SOI1$, $\Delta SOI2$, $\Delta SOI3$, and $\Delta SOI4$ between the target and actual values therein each indicate the amount of time by which the actual start of injection $SOI1_{IST}$, $SOI2_{IST}$, $SOI3_{IST}$ or, as the case may be, $SOI4_{IST}$ of the injectors controlled by the piezoactuators 1-4 deviates from the pre-specified target value $SOI_{SOLL}$.

The individual injectors' deviations $\Delta SOI$, $\Delta SOI2$, $\Delta SOI3$, and $\Delta SOI4$ between the target and actual values are taken to a computing unit 15 which calculates a mean value $\Delta SOI$ of the individual deviations $\Delta SOI1$, $\Delta SOI2$, $\Delta SOI3$, and $\Delta SOI4$ between the target and actual values.

Said mean value $\Delta SOI$ is taken to an energy controller 16 which determines a correction value $\Delta E$ as a function of the mean value $\Delta SOI$ in order to minimize the mean value $\Delta SOI$, as will be described later.

The energy controller 16 is connected on the output side to an adder 17 which, as an additional input variable, receives on the input side a pre-specified nominal value $E_{NOMINAL}$ for the actuator energy.

The adder 17 is connected on the output side to the driver circuit 5, which thus receives the sum of the nominal actuator energy $E_{NOMINAL}$ and correction value $\Delta E$ as an input variable, whereupon the driver circuit 5 controls the piezoactuators 1-4 using the corrected actuator energy E. The energy controller 16 calculates the correction value $\Delta E$ in such a way that the mean value $\Delta SOI$ of the deviations $\Delta SOI1$, $\Delta SOI2$, $\Delta SOI3$, and $\Delta SOI4$ between the target and actual values becomes minimal.

It must be mentioned in this regard that the actuator energy E is set jointly within the scope of said controlling for all piezoactuators 1-4 so that the driver circuit 5 can consist of an economical output stage (LC instead of CC).

The subtractors 11-14 are furthermore connected to a trigger controller 18 for controlling the actuator-specific deviations between the pre-specified target value $SOI_{SOLL}$ and the individual actual values $SOI1_{IST}$, $SOI2_{IST}$, $SOI3_{IST}$, and $SOI4_{IST}$. As a function of the actuator-specific deviations $\Delta SOI1$, $\Delta SOI2$, $\Delta SOI3$, and $\Delta SOI4$ between the target and actual values, the trigger controller 18 therefore calculates correction values $\Delta t1$, $\Delta t2$, $\Delta t3$, and $\Delta t4$ for the trigger time at which electric controlling of the piezoactuators 1-4 starts.

The trigger controller 18 is connected at the output side 4 to adders 19-22, which add the correction values $\Delta t1$, $\Delta t2$, $\Delta t3$, $\Delta t4$ at a pre-specified trigger time $t_{TRIGGER}$, calculate corresponding actuator-specific trigger times $t1^*_{TRIGGER}$, $t2^*_{TRIGGER}$, $t3^*_{TRIGGER}$, and $t4^*_{TRIGGER}$, then take these to the driver circuit 5, which controls the piezoactuators 1-4 accordingly. The inventive control device therefore has a second closed loop in which the trigger times for the individual piezoactuators 1-4 are individually set, as a result of which actuator-specific deviations are taken into account.

Figure 2:
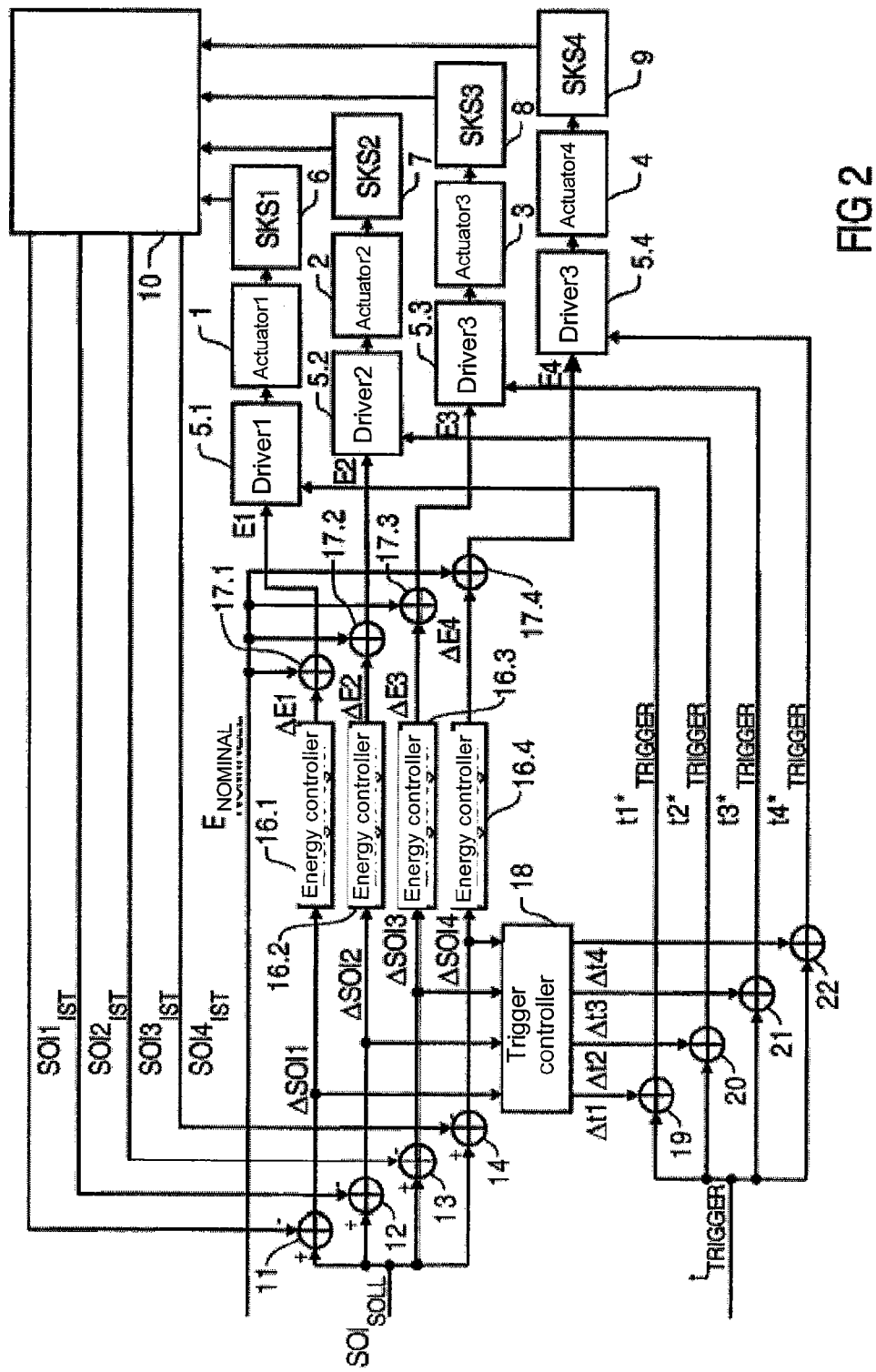
FIG. 2 is an equivalent control circuit diagram of an alternative exemplary embodiment.

As the alternative exemplary embodiment shown in FIG. 2 tallies extensively with the exemplary embodiment described in the foregoing and shown in FIG. 1, to avoid repetitions reference is made extensively to the foregoing description and the same reference numerals are employed in the following for components that match.

A special feature of said exemplary embodiment is that the energy is likewise controlled individually for each of the piezoactuators 1-4.

Accordingly four energy controllers 16.1-16.4 and accordingly four downstream adders 17.1-17.4 are also provided, with said adders 17.1-17.4 determining the corrected actuator energies E1, E2, E3, E4 individually for four driver circuits 5.1-5.4.

In this exemplary embodiment both the trigger time and the actuator energy is therefore set individually for each of the piezoactuators 1-4, as a result of which even better account is taken of actuator-specific deviations.

The invention is not restricted to the preferred exemplary embodiments described in the foregoing. Rather it is the case that a multiplicity of variations and modifications are possible that likewise utilize the inventive notion and so fall within the protected scope.

What is claimed is:

1. A control device for an actuator of an injector for a fuel injection system of an internal combustion engine, comprising
   a controlling element for electrically controlling the actuator at a specific trigger time with a specific actuator energy
   a measuring device for detecting an actual value at the start of injection, and
   a first controller for setting the actuator energy as a function of a deviation between the measured actual value at the start of injection and a pre-specified target value at the start of injection.

2. A control device according to claim 1, wherein
   the actuator energy can be set jointly within the scope of controlling for a plurality of actuators.

3. A control device according to claim 2, comprising
   a computing unit for calculating a mean value of the deviation between the target and actual values at the start of injection for a plurality of actuators, with the first controller setting the actuator energy for a plurality of actuators in keeping with the mean value.

4. A control device according to claim 1, wherein
   the actuator energy can be set individually within the scope of controlling for a plurality of actuators.

5. A control device according to claim 1, comprising
   a second controller for setting the trigger time for controlling the actuator as a function of the deviation between the measured actual value at the start of injection and the pre-specified target value at the start of injection.

6. A control device according to claim 1, wherein
   the measuring device has a seat contact switch which detects a valve needle position of the injector.

7. A control method for an actuator of an injector of a fuel injection system for an internal combustion engine, comprising the following steps:
   specifying a target value for the start of injection,
   electrically controlling the actuator at a specific trigger time with a specific actuator energy
   detecting an actual value at the start of injection,
   determining a deviation between the target and actual values at the start of injection, and
   setting the actuator energy as a function of the deviation between the target and actual values at the start of injection for controlling the start of said injection.

8. A control method according to claim 7, wherein
   controlling takes place jointly for a plurality of actuators by setting the actuator energy jointly for a plurality of actuators.

9. A control method according to claim 8, further comprising
   the following steps:
   detecting the actual value at the start of injection separately for the individual actuators,
   determining the deviation between the target and actual values at the start of injection separately for the individual actuators,
   determining the mean deviation between the target and actual values at the start of injection for a plurality of actuators, and
   setting the actuator energy jointly for a plurality of actuators according to the mean deviation between the target and actual values at the start of injection.

10. A control method according to claim 7, wherein
    controlling takes place individually for in each case one of a plurality of actuators, with the actuator energy being set in each case on an actuator-specific basis.

11. A control method according to claim 10, further comprising
    the following steps:
    detecting the actual value at the start of injection separately for the individual actuators,
    determining the deviation between the target and actual values at the start of injection separately for the individual actuators, and
    setting the actuator energy separately for the individual actuators as a function of the respective actuator-specific deviation between the target and actual values at the start of injection.

12. A control method according to claim 7, wherein the trigger time for controlling the actuators is set independently of the deviation between the target and actual values at the start of injection.

13. A control method according to claim 7, wherein
    as part of controlling and in addition to setting the actuator energy, the trigger time is also set as a function of the deviation between the target and actual values at the start of injection for controlling said start of injection.

14. A control method according to claim 13, wherein
    the actuator energy is set jointly for a plurality of actuators while the trigger time is set separately for the individual actuators.

15. A control method according to claim 7, wherein the actual value at the start of injection is detected by means of a seat contact switch, with said seat contact switch detecting a valve needle position of the injector.

16. A control method according to claim 7, wherein the actuator energy is set within the scope of controlling on a discrete time and/or on a discrete value basis.

17. A control method for an actuator of an injector of a fuel injection system for an internal combustion engine, comprising the following steps:

specifying a target value for the start of injection, electrically controlling the actuator at a specific trigger time with a specific actuator energy, detecting the actual value at the start of injection separately for the individual actuators, determining the deviation between the target and actual values at the start of injection separately for the individual actuators, determining the mean deviation between the target and actual values at the start of injection for a plurality of actuators, and setting the actuator energy jointly for a plurality of actuators according to the mean deviation between the target and actual values at the start of injection.

18. A control method according to claim 17, wherein the trigger time for controlling the actuators is set independently of the deviation between the target and actual values at the start of injection.

19. A control method according to claim 17, wherein as part of controlling and in addition to setting the actuator energy, the trigger time is also set as a function of the deviation between the target and actual values at the start of injection for controlling said start of injection.

20. A control method according to claim 19, wherein the actuator energy is set jointly for a plurality of actuators while the trigger time is set separately for the individual actuators.

* * * * *